No. 787,770. Patented April 18, 1905.

UNITED STATES PATENT OFFICE.

PAUL KLEIN, OF RIGA, RUSSIA.

PROCESS OF MANUFACTURING FIRE-BRICKS, CRUCIBLES, RETORTS, OR OTHER REFRACTORY ARTICLES.

SPECIFICATION forming part of Letters Patent No. 787,770, dated April 18, 1905.

Application filed October 2, 1903. Serial No. 175,518.

*To all whom it may concern:*

Be it known that I, PAUL KLEIN, a subject of the Emperor of Russia, residing at 577 Plettenbergstrasse, Riga, in the Empire of Russia, have invented an Improved Process of Manufacturing Fire-Bricks, Crucibles, Retorts, or other Refractory Articles, of which the following is a specification.

My invention relates to a process for manufacturing refractory articles of every description—such as bricks, crucibles, muffle-furnaces, retorts, and the like—by molding and pressing a mixture of chrome ore, fire-clay, pure hydrate of alumina, and substances which are rich in carbon and burning the same.

In carrying the process into effect finely-pulverized chrome ore is freed by washing or otherwise from the easily-fusible admixtures and is intimately mixed with powder of fire-clay to which hydrate of alumina, $Al_2(OH)_6$, is added to raise the melting-point and increase the binding capacity. This mixture is molded and pressed and then burned. It is expedient to add to the mixture a small quantity of substances which are rich in carbon—such as, for instance, resin, sugar, coal, or the like—in order that in the burning of the product a partial reduction of the chrome ore may be effected to form ferrochrome, which likewise aids in the binding of the particles of chrome ore. In lieu of chrome ore use may also be made of other substances which are difficult to fuse. Hydrate of alumina may also be replaced by other hydrates the oxids of which are highly refractory and do not give easily-fusible compounds with chrome ore.

The articles manufactured by this process show at high temperatures a neutral behavior toward acids and bases, they are distinguished by the greatest refractoriness, and slags do not adhere to them, and neither shrinkage nor distention takes place.

I am aware that prior to my invention many attempts have been made to produce refractory articles from a mixture of pulverized chrome iron ore, fire-clay, and carbonaceous material or from a mixture of pulverized chrome ore and bauxite or the like; but the processes by which these articles are manufactured have failed, because the materials employed contain impurities and easily-fusible admixtures which greatly reduce the refractoriness of the product. It will be understood that I do not claim, broadly, the use of these materials; but What I do claim as my invention, and desire to secure by Letters Patent, is—

1. A process for manufacturing refractory articles, consisting in pulverizing chrome ore, separating the easily-fusible admixtures therefrom, mixing the chrome ore thus obtained with pulverized fire-clay, and with pure hydrate of alumina, molding and pressing and then burning such mixture, substantially as herein described.

2. As a new product, a refractory article made of a mixture of pulverized chrome ore from which the easily-fusible admixtures have been removed, pulverized fire-clay, pure hydrate of alumina and carbonaceous material, the said mixture being molded and pressed and then burned, substantially as herein described.

In testimony whereof I have signed my name to this specification in the presence of two subscribing witnesses.

PAUL KLEIN.

Witnesses:
 B. G. STURMM,
 ARTHUR BULLE.